United States Patent [19]

O'Shea

[11] 3,983,094

[45] Sept. 28, 1976

[54] THERMALLY STABLE POLYURETHANE ELASTOMERS PRODUCED FROM POLY(OXYPROPYLENE)- POLY(OXYETHYLENE)GLYCOLS OF HIGH OXYETHYLENE GROUP CONTENT

[75] Inventor: Francis X. O'Shea, Naugatuck, Conn.

[73] Assignee: Uniroyal, Inc., New York, N.Y.

[22] Filed: Sept. 11, 1975

[21] Appl. No.: 612,420

[52] U.S. Cl. .................... 260/77.5 AM; 296/31 R
[51] Int. Cl.² .................... B62D 29/04; C08G 18/32
[58] Field of Search ............ 260/77.5 AM, 77.5 AP

[56] References Cited
UNITED STATES PATENTS 3,901,852  8/1975  Shah .................... 260/77.5 AM X
3,915,937  10/1975  O'Shea .................... 260/77.5 AM

*Primary Examiner*—Lewis T. Jacobs
*Attorney, Agent, or Firm*—James J. Long

[57] ABSTRACT

Flexible automobile exterior body parts are molded from a polyurethane elastomer prepared from a reaction mixture comprising:
  a. a poly(oxypropylene)-poly(oxyethylene) glycol of molecular weight of from about 1750 to about 4000 containing 15 to 50% by weight oxyethylene groups;
  b. methylenebis(4-phenylisocyanate);
  c. 1,4-butanediol.

The invention also relates to this polyurethane elastomer.

3 Claims, No Drawings

THERMALLY STABLE POLYURETHANE ELASTOMERS PRODUCED FROM POLY(OXYPROPYLENE)-POLY(OXYETHYLENE)GLYCOLS OF HIGH OXYETHYLENE GROUP CONTENT

This invention relates to a polyurethane elastomer and to shaped articles prepared therefrom.

Flexible exterior body parts for automobiles, including parts associated with energy-absorbing bumper systems such as sight shields, fender extensions and full fascia front and rear ends, require a material with a particular set of properties. The material must be capable of flexing under impact and then returning to its original shape. Therefore, it must be elastomeric in nature. It must have strength as typified by high tensile strength and high tear strength.

In addition, there are two more stringent requirements. It must be capable of withstanding dynamic impact at −20°F. and it must be resistant to distortion at 250°F. The latter requirement is imposed by typical conditions under which painted pieces are dried.

One class of materials which has been used for this purpose is polyurethane elastomers. Polyurethane elastomers are "block" type polymers resulting from the reaction of a polymeric diol of molecular weight of from about 500 to 5000 with a diisocyanate and low molecular weight difunctional compound commonly referred to as the "chain extender". The chain extender has a molecular weight below 500 and generally below 300.

The polymeric diol is recognized as the "soft" segment of the elastomer, conferring elasticity and softness to the polymer. Typically, this component has a molecular weight of about 1000 to 2000 and may be a poly(alkylene ether) glycol such as poly(tetramethylene ether) glycol or poly(oxypropylene) glycol, a polyester diol, a polycaprolactone diol or polybutadiene diol.

The combination of the diisocyanate and the chain extender comprises the "hard" segment of the elastomer, contributing rigidity and strength. Typical diisocyanates include 2,4-tolylene diisocyanate and methylenebis (4-phenylisocyanate). The chain extenders are typically diamines or diols. Typical diols which may be used are listed, for example, in U.S. Pat. Nos. 3,233,025 (col. 4, lines 20–26), 3,620,905 (col. 2, lines 53–59) and 3,718,622 (col. 2, lines 10–18).

While polyurethane elastomers as a class have excellent tear strength and can be designed to the required modulus and elongation, not all polyurethane elastomers can meet the two requirements of low temperature impact resistance and resistance to heat distortion. In fact, a polyurethane elastomer based on poly(oxypropylene) glycol as the polymeric diol and 1,4-butanediol as the chain extender has not yet been used for flexible automobile body parts because of the previous deficiencies of such an elastomer in these two areas. It is generally recognized (N. E. Rustad and R. G. Krawiec, Rubber Age, Nov. 1973, pp. 45–49) that elastomers based on poly(oxypropylene) glycols have poorer low temperature properties than those based on poly(tetramethyleneether) glycol, another polyol used in polyurethane elastomers but higher in cost. One known way to improve the low temperature properties is to increase the molecular weight of the polyol while keeping the mol ratios of ingredients constant. Unfortunately, while the low temperature properties are indeed improved, the hardness and rigidity are normally lowered markedly. See Table II, page 47 of the Rustad et al. article.

In copending application Ser. No. 469,143, filed May 10, 1974, now U.S. Pat. No. 3,915,937, Oct. 28, 1975, we described a poly(oxypropylene) glycol based elastomer suitable for automobile flexible exterior body parts. Such a material can be prepared from a polyol of approximately 1750 to 2500 molecular weight, methylenebis(4-phenylisocyanate) and 1,4-butanediol, the molar ratio of butanediol to polyol being about 3.0:1 to about 9.0:1. Our copending application was based on the fact that it was most unexpected to be able to make hard elastomers with the necessary high and low temperature properties from poly(oxypropylene) glycol.

While the specific formulation for a poly(oxypropylene) glycol based elastomer necessary to achieve the proper combination of properties had not been described prior to our copending application, there had appeared a paper describing a similar concept applied to flexible automobile body parts using elastomers based on polycaprolactone diol as the polyol. This paper, by F. E. Critchfield, J. V. Koleske and C. G. Seefried, Jr., was presented at the Automobile Engineering Meeting of the Society of Automotive Engineers in Detroit, Michigan during the week of May 14–18, 1973. Summarizing their data on the polycaprolactone diol based elastomers, the authors stated "for automotive elastomer applications, thermoplastic polyurethanes based on an approximately 2000 $M_n$ diol are more desirable since they show less modulus-temperature dependence in the use region." They also concluded: "Apparently at similar hard segment concentrations, the molecular weight of the urethane polymer soft segment has a greater effect on the temperature dependence of physical properties than the molecular length of the hard segment sequences." They attributed the unique properties of these materials to be the result of incompatibility on a microscopic scale between the hard and soft segments. In turn, "Incompatibility quite probably is due to the molecular weight of the soft segment being high enough to be immiscible in a thermodynamic sense with the hard segment."

Completely independently of the paper last mentioned above, we found as described in our copending application, that polyurethane elastomers suitable for the preparation of flexible automobile exterior body parts may be obtained from the reaction of a mixture comprising:

a. a polymeric diol selected from the group consisting of poly(oxypropylene) glycol and ethylene oxide "tipped" poly(oxypropylene) glycol containing up to 10% by weight of ethylene oxide and of molecular weight from about 1750 to about 2500 (preferably about 2000):

b. methylenebis(4-phenylisocyanate)

c. 1,4-butanediol.

In the copending application the effect of the polyol molecular weight on the required properties was demonstrated. It was shown that polymer based on 1000 molecular weight polyol failed the low temperature impact and heat distortion tests while the polymer based on 2000 molecular weight polyol passed both tests. The acceptable range of polyol molecular weight was shown to be 1750 to 2500. An elastomer prepared from 1500 molecular weight polyol was not acceptable with respect to low temperature impact while a polymer based on 3000 molecular weight polyol had lowered physical properties. The latter result was believed to be due to separation of soft and hard phases early enough in the polymerization to immobilize reactive end groups and thereby inhibit chain extension.

EXPOSITION OF THE INVENTION

Although the polymers described in the copending application are useful and can be handled with reasonable care, they do suffer from one deficiency, that of poor thermal stability at processing temperatures. In normal use this deficiency may not present a serious problem and may even go unnoticed. However, since occasions may and often do arise in which material may be left in the barrel of an extruder or an injection molding machine for extended periods at elevated temperatures, it would be advantageous for a material to have superior thermal stability. In this way it would be possible to leave the material in the machines at temperature during short shutdowns and then resume operations with no cleanout and waste necessary. In addition it would insure that inferior parts would not be produced because of thermally induced decomposition of the elastomer during the process. This is especially of concern when it is desired to use "regrind".

Unexpectedly we now have found that elastomers based on poly(oxypropylene)-poly(oxyethylene) glycol of oxyethylene group content 15% (by weight) or higher possess significantly better thermal stability than those based on polyols containing 10% or less oxyethylene group content. Particularly preferred are polyols containing 30% or more oxyethylene group content. To our knowledge, this relationship between oxyethylene group content and thermal stability has not been described previously and is quite unexpected.

In addition we have found that this improvement in thermal stability can be achieved with no sacrifice in the properties essential to automobile flexible body part use. In fact, slightly better strength properties appear to result from the use of polyols with higher oxyethylene group content.

Our invention, therefore, may be described in the following manner:

Polyurethane elastomers suitable for the preparation of flexible automobile exterior body parts may be obtained from the reaction of a mixture comprising:

a. a poly(oxypropylene)-poly(oxyethylene) glycol of molecular weight from about 1750 to about 4000 and containing 15% to 50% oxyethylene group content by weight.
b. methylenebis (4-phenylisocyanate)
c. 1,4-butanediol.

In order to study thermal stability the following test was devised. Polymer samples were molded into 2 × 0.125 × 0.125 inch tensile bars in a four cavity mold using a ½ oz. Newbury injection molding machine at barrel and nozzle temperature of 415°F. (213°C.). After several pieces were molded, material was allowed to stand in the barrel of the machine for twenty minutes at temperature. Then two more moldings were made (each molding produces four tensile bars). Tensile strength was measured on samples molded with and without this thermal treatment. In this test typical elastomers of the invention retained at least twice as much of their original tensile strength as otherwise similar elastomers made from poly(oxypropylene)-poly(oxyethylene) glycol containing 10% or less oxyethylene group content.

The elastomers of the invention meet the requirements for flexible exterior body parts for automobiles. They have a hardness of about 40 to 55 Shore D, preferably 45 to 50 Shore D. They have an elongation greater than 270%, an ultimate tensile strength of about 2900 psi or greater and a Die C tear strength of 500 pli or greater.

Painted parts made from these elastomers remain intact under a 5 MPH impact at −20°F. To simulate the dynamic conditions involved in a 5 MPH impact at −20°F., a drop impact test system was developed. The unit consists basically of a vertical guide tube, a drop weight of appropriate design and associated instrumentation.

Polymers to be evaluated were molded into 2 × 6 × 0.08 inch specimens, which were conditioned in an environmental chamber to −20°F. and then fitted into two slots 3 inches apart so that the sample formed an inverted U with a total flexed height of 2 inches. The sample was impacted at its center line with a force of 50 ft. lbs., the weight traveling at 5 MPH at impact. Drop height above the top of the sample was 38 inches. The drop weight is an 18 inch long cylinder weighing 16 lbs. It is 2.5 inches in diameter for 16.5 inches of its length and then tapers to a blunt end, which is the striking surface.

Polymers with inadequate low temperature impact resistance invariably fractured in this test whereas the polymers of the invention passed. This test correlates well with the automobile manufacturer's testing where full size parts are made and mounted on a car or a portion of a car. After cooling to −20°F., the full size part is hit with a pendulum weight which is traveling at 5 MPH.

Parts made from these elastomers also withstand paint oven temperatures of 250°F. without objectionable shrinkage or distortion. To evaluate materials for heat distortion characteristics, a sag resistance test (Heat Test O'S) was developed. The apparatus consists of a jig to hold a 2 × 6 × 0.08 inch injection molded sample in a horizontal plane. The sample is mounted with 4 inches suspended beyond the edge of the clamp. The jig with the sample is then placed in an oven preheated at 250°F. for ½ hour. The amount of sag is the difference in height from the end of the sample to a horizontal plane before and after exposure to heat. Experience with a material that was acceptable to automobile manufacturers has shown that polyurethane elastomers with a sag less than 2.0 inches by this test will perform satisfactorily in paint bake ovens used to cure painted large automotive parts. The present elastomers meet this test.

Example 1 describes the preparation of nine elastomer samples from 2000 molecular weight polyols of varying oxyethylene content and the use of the above test to study thermal stability. The data show the dramatic improvement in thermal stability of the polymers when the oxyethylene group content of the polyol exceeds 15% and particularly when it exceeds 30%.

Example 2 demonstrates the ability of an elastomer based on a 2000 molecular weight polyol containing 45% by weight oxyethylene group content to pass both low temperature and heat sag requirements for automotive parts.

While the preferred molecular weight of the polyol is about 2000, it is recognized that the molecular weight may be somewhat below or above this figure and still give acceptable properties. Thus the lower limit of molecular weight is about 1750 since Example 3 shows the utility of a polyol of 1800 molecular weight and 30% by weight oxyethylene group content.

Example 4 shows the utility of a 3000 molecular weight polyol containing 45% by weight oxyethylene content.

The upper limit for molecular weight is about 4000, although thermal stability of polymers derived from these polyols is even more dependent on oxyethylene content. Thus, Example 5 demonstrates that 30% oxyethylene group content in a 3000 molecular weight polyol does not provide the thermal stability which 45% oxyethylene group content does.

Example 6 shows that an elastomer with good properties can be prepared from a 4000 molecular weight polyol containing 30% by weight oxyethylene group content. Our previous application showed that with untipped poly(oxypropylene) glycol even 3000 molecular weight gave an elastomer with unacceptable strength.

The molar ratio of chain extender to polyol which may be used ranges from 3/1 to 12/1 depending on the molecular weight of the polyol. It ranges from 3/1 for a 1750 molecular weight polyol to 12/1 for a 4000 molecular weight polyol. The preferred molar ratio of chain extender to polyol for a 2000 molecular weight polyol ranges from 4/1 to 6/1 with 5.0 to 5.5 being preferred.

The polyol may be either a "tipped" polyol in which a poly(oxypropylene) glycol is reacted further with ethylene oxide giving rise to oxyethylene group blocks on each end of the polyol or a more random poly(oxypropylene)-poly(oxyethylene) glycol in which the propylene oxide and ethylene oxide reactants are introduced together or in alternating portions. The preparation of both types of polyol is described in "Polyurethanes: Chemistry and Technology", Part I. Chemistry, by J. H. Saunders and K. C. Frisch, Interscience, New York, 1962, pp. 36–37. The technique of tipping is further described in "Advances in Urethane Science and Technology" by K. C. Frisch and S. L. Reegan, Technomic Publishing Company, Westport, Conn., 1973, pp. 188–193.

The polymers of examples 1–7 were prepared from tipped polyols. In example 8, a random poly(oxypropylene)-poly(oxyethylene) glycol was employed and the results show that a thermally stable polymer results. Thus, oxyethylene group content, regardless of position in the polyol, is the major factor in improved thermal stability.

The oxyethylene group content of the polyol may range from 15 to 50% with the higher levels being preferred for the higher molecular weight polyols. For a 2000 molecular weight polyol the preferred oxyethylene group content is 25–45%. The NCO/OH ratio used to prepare the elastomers may range from 0.95 to 1.2 with 1.00 to 1.05 being preferred.

In our previous application we indicated a preference for preparing the elastomer by a prepolymer process in which the polyol is first reacted with the chain extender in a separate step. Although that process is still preferred, many of the elastomers of this invention may be prepared by a "one-shot" technique in which the polyol, chain extender and diisocyanate are reacted together in one step. This is rendered possible by the high oxyethylene group content of the polyol which gives greater compatibility in a "one shot" reaction. In addition, the tipped polyols, by virtue of the high primary hydroxyl content are more reactive with diisocyanates tending also to give better results in a "one shot" reaction. The preparation of an elastomer of this invention by a "one shot" reaction is described in Example 7.

A catalyst may or may not be used as desired. Some examples of useful catalysts are N-methyl-morpholine, N-ethyl-morpholine, triethyl amine, triethylene diamine (Dabco; trademark), N,N'-bis(2-hydroxypropyl)-2-methyl piperazine, dimethyl ethanol amine, tertiary amino alcohols, tertiary ester amines, stannous octoate, dibutyl tin dilaurate and the like.

EXAMPLE 1

Nine elastomer samples were prepared in the following manner.

The polyol or polyol blend (0.23 equivalent) was dried at 100°C under vacuum (~ 2 mm. Hg) for one hour. It was then cooled at 50°C and 1.38 equivalents of 4,4'-methylenebis (phenyl isocyanate) was added. The mixture then was heated at 80°C. for two hours under dry nitrogen.

To a weighed portion of this prepolymer (1.08 equivalents) heated to 110°C was added 1.03 equivalents of 1,4-butanediol at 60°. The mixture was open cast and cured for 20 minutes at 163°C.

It was then diced, dried for two hours at 110°C. and injection molded into 2 × 0.125 × 0.125 inch tensile bars in a four cavity mold. Molding was carried out in a ½ oz. Newbury injection molding machine at barrel and nozzle temperatures of 213°C. (415°F.) After several pieces were molded, material was allowed to stand in the barrel of the machine for 20 minutes at temperature. Then two more moldings were made (each molding produces four tensile bars). Tensile strength was determined before and after the thermal treatment and are recorded in Table I, along with the percentage of tensile strength retained.

The polyols and blends had the following composition. One polyol (Polyol A) was a 2000 molecular weight ethylene oxide tipped poly(oxypropylene) glycol containing 10% by weight ethylene oxide. Another polyol (Polyol B) was a 2000 molecular weight ethylene oxide tipped poly(oxypropylene) glycol containing 45% by weight ethylene oxide. Blends of the two polyols were also prepared in which the weight percent of ethylene oxide ranged from 15 to 40% in 5% increments. An additional sample was prepared from an untipped poly(oxypropylene) glycol.

Results of the thermal stability tests are as follows:

TABLE I

| % Ethylene Oxide in Polyol | Original Tensile | Tensile After Thermal Treatment | % Tensile Retained |
|---|---|---|---|
| 0 | 2800 | * | |
| 10 | 2780 | 760 | 27 |
| 15 | 3080 | 2160 | 70 |
| 20 | 3080 | 2170 | 71 |
| 25 | 2980 | 2120 | 71 |
| 30 | 3440 | 3250 | 95 |
| 35 | 3390 | 3300 | 97 |
| 40 | 3660 | 3410 | 93 |
| 45 | 3620 | 3430 | 95 |

*degraded - could not mold.

The data shows the dramatic improvement in thermal stability of the polymer when ethylene oxide content of the polyol exceeds about 15% and particularly when it exceeds about 30%.

EXAMPLE 2

Nine hundred ninety four parts of a 994 eq. wt. poly-(oxypropylene) glycol tipped with 45% by weight ethylene oxide was dried for 1 hour at 100°C and 2 mm. Hg vacuum. It was then cooled to 50°C. under dry nitrogen and 950 parts of pure MDI was added. The mixture was then heated at 80°C. for 2 hours.

A portion of this prepolymer (1855 parts) was then heated to 110°C., and 268 parts of 1,4-butanediol at 60°C. was added. The mixture was well mixed for 20 seconds, open cast and cured for 20 minutes at 163°C.

The polymer was then diced, dried for 2 hours at 110°C. and injection molded into 2 × 6 × 0.080 inch plaques.

Physical properties were as follows:

| | |
|---|---|
| Hardness Shore D | 54 |
| 100% Modulus | 2140 |
| Tensile Strength | 4030 |
| Elongation | 280 |
| Die C Tear | 750 |

These plaques passed the low temperature impact test described previously. In addition, the heat sag according to "Heat test O'S" was 1¾ inches.

EXAMPLE 3

In the same manner as described in Example 2, 225 parts of an 1800 molecular weight poly(oxypropylene) glycol tipped with 30% by weight ethylene oxide was converted to a prepolymer with 177 parts of pure MDI. A portion of this prepolymer (379 parts) was then converted to the elastomer with 45 parts of 1,4-butanediol.

This polymer was injection molded into tensile bars and tested for thermal stability as described in Example I. The results were as follows:

| | Initial | After 20 min. at 415°F |
|---|---|---|
| Shore D Hardness | 45 | — |
| 100% Modulus | 1150 | 1130 |
| 300% Modulus | 2270 | 2070 |
| Tensile Strength | 3720 | 3870 |
| Elongation | 440 | 490 |

EXAMPLE 4

In the same manner as described in Example 2, 250 parts of a 2860 mol. wt. poly(oxypropylene) glycol tipped with 45% by weight ethylene oxide was converted to a prepolymer with 222 parts of pure MDI. A portion of this prepolymer (460 parts) was then converted to the elastomer with 68.4 parts of 1,4-butanediol.

This polymer was injection molded into tensile bars and tested for thermal stability as described in Example 1 except at a temperature of 430°F. The results were as follows:

| | Initial | After 20 min. at 430°F |
|---|---|---|
| Shore D Hardness | 43 | 44 |
| 100% Modulus | 1600 | 1580 |
| 300% Modulus | 2540 | 2310 |
| Tensile Strength | 3570 | 3260 |
| Elongation | 430 | 460 |

EXAMPLE 5

In the same manner as described in Example 2, 250 parts of a 3040 molecular weight poly(oxypropylene) glycol tipped with 30% by weight ethylene oxide was converted to a prepolymer with 208 parts of pure MDI. A portion of this prepolymer (450 parts) was then converted to the elastomer with 64.3 parts of 1,4-butanediol.

This polymer was injection molded into tensile bars and tested for thermal stability as described in Example 1 except at a temperature of 430°F. The results were as follows:

| | Initial | After 20 min. at 430°F. |
|---|---|---|
| Shore D Hardness | 43 | 30 |
| 100% Modulus | 1650 | 992 |
| 300% Modulus | 2430 | — |
| Tensile Strength | 3500 | 1094 |
| Elongation | 500 | 143 |

EXAMPLE 6

In the same manner as described in Example 2, 250 parts of a 3800 molecular weight poly(oxypropylene) glycol tipped with 30% by weight ethylene oxide was converted to a prepolymer with 212 parts of pure MDI. A portion of this prepolymer (450 parts) was then converted to the elastomer with 56.5 parts of 1,4-butanediol.

This polymer was injection molded into tensile bars. Physical properties were as follows:

| | |
|---|---|
| Shore D Hardness | 47 |
| 100% Modulus | 1760 |
| 300% Modulus | 2660 |
| Tensile Strength | 3350 |
| Elongation | 430 |

EXAMPLE 7

Two hundred fifty four parts of a 1015 equivalent weight poly(oxypropylene) glycol tipped with 45% by weight ethylene oxide was dried for 1 hour at 100°C. and 2 mm. Hg vacuum. Anhydrous 1,4-butanediol (53 parts) was then added and the mixture was stirred and heated to 110°C.

To 290 parts of this mixture at 110° was added 176 parts of pure MDI which had been heated to 70°C. The mixture was stirred vigorously and allowed to exotherm. At a temperature of 120°C., the mixture was open cast and cured for 20 min. at 163°C.

The polymer was then granulated and dried for 2 hours at 110°C. It was then injection molded into tensile bars and tested for thermal stability as described in Example 1. The results were as follows:

| | Initial | After 20 min. at 415°F. |
|---|---|---|
| Shore D Hardness | 45 | 44 |
| 100% Modulus | 1130 | 1000 |
| 300% Modulus | 1980 | 1730 |
| Tensile Strength | 3330 | 3350 |
| Elongation | 490 | 560 |

EXAMPLE 8

In the same manner as described in Example 2, 259 parts of a 2000 molecular weight poly(oxypropylene)-poly(oxyethylene) glycol containing 45% by weight randomly distributed oxyethylene groups were converted to a prepolymer with 202 parts of pure MDI. A portion of this prepolymer (449 parts) was then converted to the elastomer with 55 parts of 1,4-butanediol.

This polymer was injection molded into tensile bars and tested for thermal stability as described in Example 1. The results were as follows:

|  | Initial | After 20 min. at 415°F. |
|---|---|---|
| 100% Modulus | 1030 | 970 |
| 300% Modulus | 2490 | 2130 |
| Tensile | 3580 | 3060 |
| Elongation | 370 | 370 |

The automobile flexible body parts, which are a desired end-product of this invention, are fabricated by injection molding using the already prepared polyurethane elastomer as the molding material. In this method, the elastomer is made into small dice or pellets suitable for feeding to injection molding machines. Using the same preformed material, a part may also be prepared by extrusion techniques including profile extrusion and sheet extrusion followed by vacuum forming.

Alternatively, the part may be formed by the method termed "liquid reaction molding", in which the reactants are rapidly injected into a mold wherein they cure to form the shaped elastomeric article directly. In this method, the polyol, chain extender and diisocyanate may be reacted in one step (one shot method) or the polyol and diisocyanate may be prereacted and then injected along with the chain extender to form the molded article (pre-polymer method).

What is claimed is:

1. A thermally stable polyurethane elastomer which is a reaction product of: (a) a poly(oxypropylene)-poly(oxyethylene) glycol of molecular weight from about 1750 to about 4000 and containing 15 to 50% by weight oxyethylene groups; (b) methylenebis(4-phenylisocyanate); and (c) 1,4-butanediol; the NCO-/OH equivalents ratio being from 0.95 to 1.2 and the molar ratio of (c) to (a) being from 3/1 to 12/1, said elastomer having a hardness of about 40 to 55 Shore D, an elongation of greater than 270%, an ultimate tensile strength of at least 2700 psi and a Die C tear strength of at least 500 pli, said elastomer displaying improved thermal stability as evidenced by its ability to retain at least twice as much of its original tensile strength, after exposure to a temperature of 415°F. for 20 minutes, as an otherwise similar elastomer in which (a) contains 10% or less oxyethylene groups.

2. A thermally stable polyurethane elastomer as in claim 1 in which the molecular weight of (a) is about 2000 and the oxyethylene group content is 30–45%.

3. A shaped article prepared from the thermally stable polyurethane elastomer of claim 1 and characterized, when having a thickness of 0.08 inch, by remaining intact under a 5 mile per hour impact at −20°F. and by having a sag of less than 2 inches as determined by the Heat Test O'S.

* * * * *

Notice of Adverse Decision in Interference

In Interference No. 99,674, involving Patent No. 3,983,094, F. X. O'Shea, THERMALLY STABLE POLYURETHANE ELASTOMERS PRODUCED FROM POLY(OXYPROPYLENE)-POLY(OXYETHYLENE) GLYCOLS OF HIGH OXYETHYLENE GROUP CONTENT, final judgment adverse to the patentee was rendered Apr. 3, 1979, as to claims 1 through 3.

[*Official Gazette September 4, 1979.*]